Patent text begins …

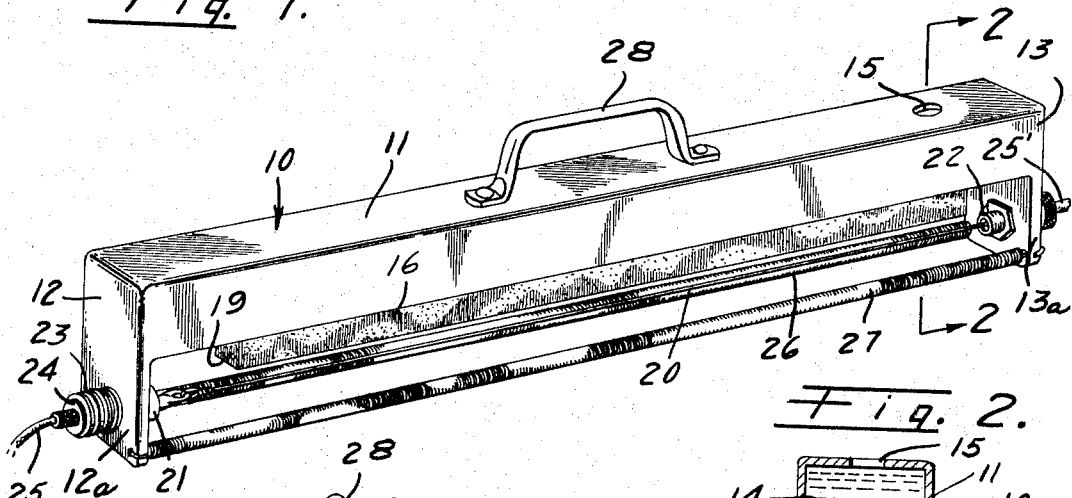

United States Patent Office 3,341,389
Patented Sept. 12, 1967

3,341,389
PACKAGING FILM WELDER AND CUTTER
William S. West, 2600 California Ave.,
San Marino, Calif. 91108
Filed Nov. 23, 1964, Ser. No. 413,097
5 Claims. (Cl. 156—498)

ABSTRACT OF THE DISCLOSURE

Packaging apparatus for successively performing the operations of welding, severing and sealing of superposed layers of film sheet material along an axis, the sheet material being conducted between a platform and relatively movable frame structure upon which there are supported a pair of laterally spaced coiled spring holding members adapted upon initial downward movement of the frame towards the platform to engage the sheets and press them together on opposite sides of the axis; an elongate wire heating element between the spring holding members for engaging the held film along the axis upon further movement of the frame; and a pressing member, carrying a quenching fluid, having a position normally spaced above the heating element but engageable therewith and along the adjacent axis margins of the material, when the frame is further moved downwardly to a final operative position.

---

The present invention relates generally to the art of packaging, and is more particularly concerned with improvements in apparatus and method for the bonding or welding of plastic film packaging materials, and/or severing the same in the carrying out of packaging operations.

The use of a heating element for welding and severing conventional plastic films, such as are now being utilized for the packaging of objects and materials, has presented problems which heretofore necessitated relatively complex and expensive apparatus. The primary problems stem from the fact that the film shrinks under the application of heat, and if the temperature is too high will tend to blow out and form holes along the weld or bond, and in some cases cause objectionable sticking of the material to adjacent surfaces. Various expedients have been tried, with questionable success, to surmount these inherent disadvantages and problems attending current procedures. Cold clamping, impulse heaters, etc. have been suggested and tried, but these have in the main proved to be very expensive and embody uneconomical complex arrangements.

Having the foregoing problems and disadvantages in mind, the present invention has for one object the provision of apparatus which is simple of construction, economical to produce, and by means of which it is possible to carry out the steps of my improved method for sealing or welding superposed sheets of plastic packaging film materials.

A further object is to provide an apparatus and method, wherein the film material will be subjected to instant quench cooling during a heat sealing operation or immediately after a severing or cutting operation, when such latter operation is included in the packaging procedure. By the expedient of quick quenching, shrinkage and blowing of the material at the weld or seal is effectively prevented.

Another object is to provide an arrangement in which the inherent advantages of the present invention may be embodied into relatively inexpensive, simple apparatus which may be hand manipulated, and which is simple to use.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

FIG. 1 is a perspective view of apparatus according to the present invention;

FIG. 2 is a transverse sectional view, taken substantially on line 2—2 of FIG. 1;

FIGS. 3a, 3b, 3c and 3d are views diagrammatically illustrating sequential operations of the apparatus in carrying out a packaging procedure; and FIG. 4 is a view diagrammatically showing a modified structural arrangement.

The basic concepts in the present invention, and the practice of my novel method may be carried out by means of apparatus which may vary as to details of construction. For illustrative purposes, there is shown in FIG. 1 an arrangement wherein the invention has been embodied into portable apparatus susceptible of hand manipulation.

More specifically, the apparatus disclosed comprises an elongate rigid frame structure 10 in which a hollow tubular member 11 provides the main body of the frame structure, this member being closed at its ends by end members 12 and 13 respectively, and which have projecting portions 12a and 13a which serve as end brackets. The hollow member 11 provides a container or compartment 14 for a fluid which may be introduced thereinto through an opening 15.

Along the side of the hollow member 11, from which the brackets 12a and 13a extend, there is provided a longitudinally extending presser member 16 of wicking or other suitable material having the property of being able to transmit fluid. This member may be secured in position by means of a suitable adhesive 17, or by other means, so as to be positioned over a plurality of outlet openings 18 which provide a series of outlets from the compartment 14 for the fluid, so that the fluid may be transmitted through the presser member to its active pressing surface 19.

The fluid may comprise any suitable gas or liquid which may be utilized as a quenching medium for cooling in a manner to hereafter be described. Thus, water, carbon dioxide or other coolant may be utilized.

Extending over and in spaced relation to the surface 19, there is provided a heating element 20, shown as comprising an electrically energizable wire which is supported in terminal insulators 21 and 22, these insulators being respectively supported in the brackets 12a and 13a. The heating element is suspended under tension forces, a compression spring 23 being provided around a projecting end of the insulator 21, one end of this spring being in abutment engagement with the bracket 12a while the other end engages a disc member 24. The insulator 21 is slidably supported in the bracket 12a, and a suitable electric supply conductor 25 electrically connects with the heating element to provide electrical energizing current thereto. The circuit may be completed either through a ground connection with the frame structure 10, or through a separate conductor 25' at the opposite end of the heater element 20.

Slightly spaced below the heating element 20, a pair of holding members 26 and 27 extend along opposite sides of the heating element. These holding members are disclosed in each case as comprising a coiled spring, the opposite ends of the spring being anchored respectively in the brackets 12a and 13a.

By utilizing resilient holding members which may be laterally deflected, these holding members may be translated by downward pressure against an engaged surface so that the holding members and the heating element will be coplanar. Further, that upon further pressure, the heating element and holding members may be relatively moved so as to be coplanar with the pressing surface 19. Thus, with the foregoing arrangement, means are provided whereby sequential operation of the holding members, heating element and presser member may be obtained and the apparatus utilized in carrying out a packaging operation. A handle 28 at the top of the hollow member 11 enables movement of the apparatus from one operating position to another, and further permits the application of pressure for effecting sequential operation of the holding elements, heating element and presser member in a manner which will be clearly evident from the following operational description.

As shown in FIG. 3a, an article 29 to be packaged has the packaging film sheet material gathered around it. This material may be fed from a pair of supply rolls as schematically represented and indicated by numerals 30 and 31, the leading edges of the supplied material preferably being bonded together along a bond line as indicated at 32. The following material may thus form superposed layers 33 and 34 which extend over a suitable platform 35 or other flat surface. Preferably, the platform is resiliently supported as by springs 36. At this point, the superposed layers are in rather loose engagement and are not firmly held.

With the apparatus of the present invention positioned above the superposed layers, the apparatus is manually lowered so as to bring the holding members 26 and 27 into engagement with the superposed layers of film material. As the pressure is increased, these layers are forcefully pressed against the platform 35 and the layers held against relative movement, as shown in FIG. 3b.

Continuing the downward pressure, the apparatus is further moved downwardly to bring the heating element 20 into engagement with the superposed layers for the purpose of welding the superposed layers together along an axis of weld established by the relative position of the heating element. As the heating element approaches the superposed sheets of film material, the heating element and holding members are brought into coplanar relationship by virtue of the deflection of the holding member; as shown in FIG. 3c.

Referring now to FIG. 3d, the apparatus is further moved downwardly with a substantially continuous motion, whereupon the hot heating element 20 engages and welds the superposed sheets of film material along its opposite sides to form a seal 37 for the package containing the article 29, and at the same time the bond 32 which connects the strips from the rollers 30 and 31 for a subsequent packaging operation.

Substantially simultaneously with the welding and severing of the superposed sheets of film by the hot heating element, further downward movement of the frame structure 10 will bring the pressing surface 19 of the presser member 16 into engagement with the hot wire and the seal 37 and bond 32 portions along each side. Quenching fluid is thus applied to combat shrinkage tendencies and prevent blowouts of the welded film material. It is now only necessary to raise the frame structure 10 in order to remove the apparatus and prepare for the next packaging operation.

In the foregoing description of operation of the apparatus, the apparatus was utilized for welding the superposed sheets of film material along opposite sides of the heating element, which also functioned to sever the film material and release the packaged article. There are operations, however, where it may be desirable to omit the severing or cutting of the material, and simply use the apparatus for sealing overlying edges of film material without melting the material all the way through. For this purpose, the apparatus may be slightly modified as shown in FIG. 4. In this arrangement, instead of the heating element being carried by the frame structure 10, the heating element, as indicated at 20', is in this case recessed in the upper surface of the platform 35 as by placing the heating element in a suitable groove 38 or by other means so that the heating element is below the upper surface of the platform. In this arrangement, the heating element is shielded against direct contact with the lowermost sheet of the superposed sheets by providing a shield 39 over the upper surface of the platform and the heating element, this shield being of a suitable material such as high temperature silicon rubber.

In the operation of this form of the invention, the loosely engaged superposed sheets extend over the shield 39. At this point, there will be no melting of the adjacent film material by the heating element. However, by placing the apparatus in operative position over the superposed layers and then depressing the frame structure 10, the presser member 16 will engage the uppermost of the superposed sheets and the sheets will be forced into intimate engagement and against the shield immediately above the heating element. Thus, there will be the heating element in engagement with the bottom layer and the presser element 16 in engagement with the upper layer to discharge quenching fluid under pressure against the uppermost of the superposed layers above the heating element. In this manner, the heating element will melt the lowermost of the superposed sheets along the axis of the heating element to form a seal, while at the same time the quenching action of the fluid on the uppermost layer prevents its being melted. Severance or cutting of the superposed sheets is thus prevented and a sealed bonding together of the sheets is obtained.

Various modifications may suggest themselves to those skilled in the art without departing from the spirit of my invention, and hence, I do not wish to be restricted to the specific form shown or uses mentioned, except to the extent indicated in the appended claims.

I claim:

1. Apparatus for securing together superposed sheet portions of plastic film material along an axis, comprising:
    (a) means for supporting the superposed sheets;
    (b) an elongate heating element movable from a position above said axis into engagement with the sheet material extending along said axis;
    (c) an elongate container for a quenching fluid; and
    (d) a presser element of compressible material extending along one side of said container, said element having flow channels therein for conducting fluid from said container to a pressing surface thereof and said fluid container and presser element being movable as a unit to position the pressing surface over said heating element and adjacent sheet material along said axis for urging the same against said supporting means and deliver quenching fluid along said axis.

2. Apparatus for securing together superposed sheet portions of plastic film material along an axis, comprising:
    (a) a manually manipulatable frame structure including an elongate chamber for a fluid medium;
    (b) brackets extending from said frame structure respectively at opposite ends of said chamber;
    (c) a presser element carried by said frame structure exteriorly along one side of said chamber;
    (d) means forming fluid flow channels in said element for conducting fluid from said chamber to a pressing surface of said element; and
    (e) an elongate heating element resiliently supported from said brackets in spaced parallel relation to said pressing surface, said surface and heating element being relatively movable into engagement.

3. Apparatus for securing together superposed sheet portions of plastic film material along an axis, comprising:
    (a) a manually manipulated frame structure including an elongate chamber for a fluid medium;

(b) brackets extending from said frame structure respectively at opposite ends of said chamber;
(c) a presser element carried by said frame structure exteriorly along one side of said chamber;
(d) means forming fluid flow channels in said element for conducting fluid from said chamber to a pressing surface of said element; and
(e) an elongate electrically energizable heating element resiliently tensioned between said brackets in spaced parallel relation to said pressing surface, and being laterally deflectable into engagement with said pressing surface.

4. Apparatus for securing together superposed sheet portions of plastic film material along an axis, comprising:
(a) a manually manipulatable frame structure including an elongate chamber for a fluid medium;
(b) brackets extending from said frame structure respectively at opposite ends of said chamber;
(c) a presser element carried by said frame structure exteriorly along one side of said chamber;
(d) means forming fluid flow channels in said element for conducting fluid from said chamber to a pressing surface of said element;
(e) an elongate electrically energizable heating element resiliently tensioned between said brackets in spaced parallel relation to said pressing surface, and being laterally deflectable into engagement with said pressing surface; and
(f) a pair of parallel holding members extending between said brackets on laterally spaced opposite sides of said heating member at a slightly greater distance from said presser surface than the distance of said heating element, said holding members being movable into positions coplanar with the heating element.

5. Apparatus according to claim 4, wherein the holding elements respectively comprise a coiled spring.

References Cited
UNITED STATES PATENTS

| | | | |
|---|---|---|---|
| 3,009,851 | 11/1961 | Madsen | 156—515 |
| 3,015,600 | 1/1962 | Cook | 156—515 |
| 3,017,314 | 1/1962 | Kebekus et al. | 156—515 |
| 3,162,564 | 12/1964 | Buchner | 156—498 |
| 3,234,072 | 2/1966 | Dreeben | 156—498 |

FOREIGN PATENTS 664,424  6/1963  Canada.

EARL M. BERGERT, *Primary Examiner.*
DOUGLAS J. DRUMMOND, *Examiner.*